(12) United States Patent  
Harthcock

(10) Patent No.: US 7,073,048 B2
(45) Date of Patent: Jul. 4, 2006

(54) CASCADED MICROCOMPUTER ARRAY AND METHOD

(75) Inventor: Jerry D. Harthcock, Plano, TX (US)

(73) Assignee: Silicon Lease, L.L.C., Dallas, TX (US)

( * ) Notice: Subject to any disclaimer, the term of this patent is extended or adjusted under 35 U.S.C. 154(b) by 445 days.

(21) Appl. No.: 10/144,524

(22) Filed: May 13, 2002

(65) Prior Publication Data

US 2003/0182534 A1     Sep. 25, 2003

Related U.S. Application Data

(60) Provisional application No. 60/355,142, filed on Feb. 4, 2002.

(51) Int. Cl.
*G06F 15/16* (2006.01)

(52) U.S. Cl. ......................................... 712/34; 712/203
(58) Field of Classification Search .................. 712/34, 712/203, 206, 225
See application file for complete search history.

(56) References Cited

U.S. PATENT DOCUMENTS

| 4,809,169 | A | * | 2/1989 | Sfarti et al. | 712/20 |
|---|---|---|---|---|---|
| 4,994,902 | A | * | 2/1991 | Okahashi et al. | 257/665 |
| 4,994,961 | A | * | 2/1991 | MacGregor et al. | 710/110 |
| 5,430,885 | A | * | 7/1995 | Kaneko et al. | 712/12 |
| 5,504,932 | A | * | 4/1996 | Vassiliadis et al. | 712/208 |
| 5,909,565 | A | * | 6/1999 | Morikawa et al. | 712/200 |
| 5,923,893 | A | * | 7/1999 | Moyer et al. | 712/38 |
| 6,003,124 | A | * | 12/1999 | Laborie | 712/34 |
| 6,154,857 | A | | 11/2000 | Mann | 714/30 |
| 6,247,113 | B1 | * | 6/2001 | Jaggar | 712/200 |
| 6,275,891 | B1 | | 8/2001 | Dao et al. | 710/132 |
| 6,775,762 | B1 | * | 8/2004 | Miyake et al. | 712/219 |

* cited by examiner

*Primary Examiner*—Eric Coleman
(74) *Attorney, Agent, or Firm*—Steven W. Smith

(57) ABSTRACT

A microcomputer array and method having a hyper-scalable, real-time monitoring and debug architecture in which several microcomputers are cascaded together into a single, more powerful unit. A cascaded instruction pipeline and related control circuitry allow a plurality of subprocessors or "proto-processors" to be cascaded with the instruction pipeline of a head processor or "nucleus processor" thereby creating an array of processors. The proto-processors may operate independently performing peripheral functions until a cascaded instruction takes priority and causes one or more proto-processors to perform the cascaded instruction and send the results to the nucleus processor. The processors may be microcomputers or Digital Signal Processors (DSPs).

17 Claims, 11 Drawing Sheets

FIG. 12

CASCADED MICROCOMPUTER ARRAY AND METHOD

PRIORITY STATEMENT UNDER 35 U.S.C. § 119(e) & 37 C.F.R. § 1.78

This nonprovisional application claims priority based upon, and fully incorporates herein, the prior U.S. provisional patent application No. 60/355,142 entitled, "Microcomputer Array With Cascaded Instruction Set", filed Feb. 4, 2002 in the name of Jerry D. Harthcock.

BACKGROUND OF THE INVENTION

1. Technical Field of the Invention

This invention relates generally to microcomputer architectures. More particularly, and not by way of limitation, the present invention is directed to a microcomputer array having a hyper-scalable, real-time monitoring and debug architecture in which several microcomputers are cascaded together by way of a cascaded instruction pipeline into a single, more powerful unit.

2. Description of Related Art

In the semiconductor industry today, there is a trend to implement custom systems on a chip. In such a system-on-a-chip, there is normally a processor and a number of peripherals that perform different system functions. For example, there may be a Universal Asynchronous Receiver-Transmitter (UART), a number of drivers, input/output processors (IOPs), and so on. In some cases there may be multiple processors along with hard logic that performs the different input/output (I/O) functions.

There are several problems with the existing approach for implementing custom systems-on-a-chip. One such problem is the long time to market. The IPs have to be designed and implemented in hardware to perform the specific hardware functions. This is a long and expensive process. The IPs then have to be integrated onto a single chip. Implementing the IPs in software is a possible solution to reduce the time required for hardware implementation. Historically, however, this has not been done because of several problems that developers were not able to overcome.

First is the problem of debugging the software. Each individual hardware function that is being performed in software must be simultaneously debugged in real time along with the coordinating software that makes everything work together. This is a daunting task that developers have often found takes longer than implementing the functions in hardware. Second is the problem of orchestrating the overall functioning of the system. Generally, a master processor must interact with and convey instructions to slave processors that perform the IP functions. In a first technique called Direct Memory Access (DMA), a bus arbitration process takes place between the master processor and one or more slaves. This is necessary in order to program the slaves to perform their intended functions, to configure them, and to communicate the results of the slave processing to the master. A second technique for communicating between the master processor and a slave processor is to use a mailbox scheme that, in one configuration, is performed by a serial shift register that is shifted between the master and the slave. In another mailbox configuration known as a parallel access mailbox, messages between the master and slave are passed by way of parallel registers or a dual-port memory.

A disadvantage of both of these techniques is that they require a significant amount of software overhead to implement them. To implement the hardware functions in software with one processor is a resource intensive operation. The operation takes up a lot of cycles, and overburdens the processor because of the software overhead involved.

In order to overcome the disadvantage of existing solutions, it would be advantageous to have an array of microcomputers and a method for implementing a system-on-a-chip that implements the peripheral functions in software, but does not overburden the nucleus processor with overhead software requirements. In addition, such an array would have a real-time simultaneous monitoring and debug capability. The present invention provides such an array and method.

SUMMARY OF THE INVENTION

In one aspect, the present invention is directed to an array of microcomputers having a hyper-scalable, real-time monitoring and debug architecture in which several microcomputers are cascaded together into a single, more powerful unit. The architecture of the present invention comprises a novel cascadable instruction pipeline and related control circuitry which allows, in the exemplary embodiment described herein, up to nine (9) subprocessors or "proto-processors" to be cascaded with the instruction pipeline of a head processor or "nucleus processor" thereby creating an array of ten (10) or fewer processors. The processors may be microcomputers or Digital Signal Processors (DSPs).

In another aspect, the present invention is directed to a hyper-scalable microcontroller that includes a nucleus processor; a cascaded instruction pipeline; at least one proto-processor connected to the nucleus processor through the cascaded instruction pipeline; and control circuitry that selectively causes the proto-processor to operate independently or as an extension of the nucleus processor. In one embodiment, the control circuitry causes the nucleus processor to continuously feed a plurality of cascaded instructions into the cascaded instruction pipeline. The proto-processor includes means for monitoring the cascaded instructions to determine whether the proto-processor is to execute or ignore each instruction.

In another aspect, the present invention is directed to compound instruction logic in a nucleus processor for registering, decoding, and executing instruction logic. The logic fetches and decodes compound instructions, and if a fetched instruction is a cascade instruction, the logic presents the cascade instruction in a partially decoded form to associated proto-processors via a cascaded instruction pipeline. The nucleus processor receives processing results from the proto-processors and loads the results into its working (W) register without the use of DMA circuitry or interrupts. During the execution of cascade instructions, the nucleus processor enters hyperscaled mode and dynamically scales itself by making any given proto-processor below it an extension of itself even while the proto-processors are running their own local applications and in real-time without halting the proto-processors.

In yet another aspect, the present invention is directed to a microcomputer that includes a plurality of execution units that fetch, decode, and selectively execute compound instructions; and a cascaded instruction pipeline that carries a stream of compound instructions to the plurality of execution units. Each of the compound instructions includes an indication of which of the plurality of execution units is to execute each instruction. The microcomputer may also include a plurality of program memories, each of the program memories being associated with one of the plurality of execution units. Each of the program memories provides specific application program instructions to a particular execution unit. The microcomputer may also include means for prioritizing the compound instructions and the application program instructions for each of the execution units so that each of the execution units executes its specific application program instructions until a particular execution unit fetches and decodes a compound instruction that indicates that the particular execution unit is to execute the compound instruction. At that time, the compound instruction takes priority and is executed by the particular execution unit.

In yet another aspect, the present invention is directed to a method of controlling a plurality of microprocessors. The method includes the steps of connecting a plurality of proto-processors to a nucleus processor through a cascaded instruction pipeline; and selectively causing each of the plurality of proto-processors to operate independently or as an extension of the nucleus processor. The nucleus processor selectively causes the plurality of proto-processors to operate independently or as an extension of the nucleus processor by continuously placing a plurality of cascaded instructions into the cascaded instruction pipeline. Each of the cascaded instructions is monitored by the plurality of proto-processors to determine by each particular proto-processor, whether the particular proto-processor is to execute each instruction.

BRIEF DESCRIPTION OF THE DRAWINGS

The invention will be better understood and its numerous objects and advantages will become more apparent to those skilled in the art by reference to the following drawings, in conjunction with the accompanying specification, in which:

FIG. 12 is a simulation timing diagram illustrating the relationship of nucleus processor signal timing with respect to responsive proto-processor signal timing during execution of the PTLBW of a B(ranch) instruction sequence to locations 0000 and 0001 (reset vector)

DETAILED DESCRIPTION OF EMBODIMENTS

Figure 1:
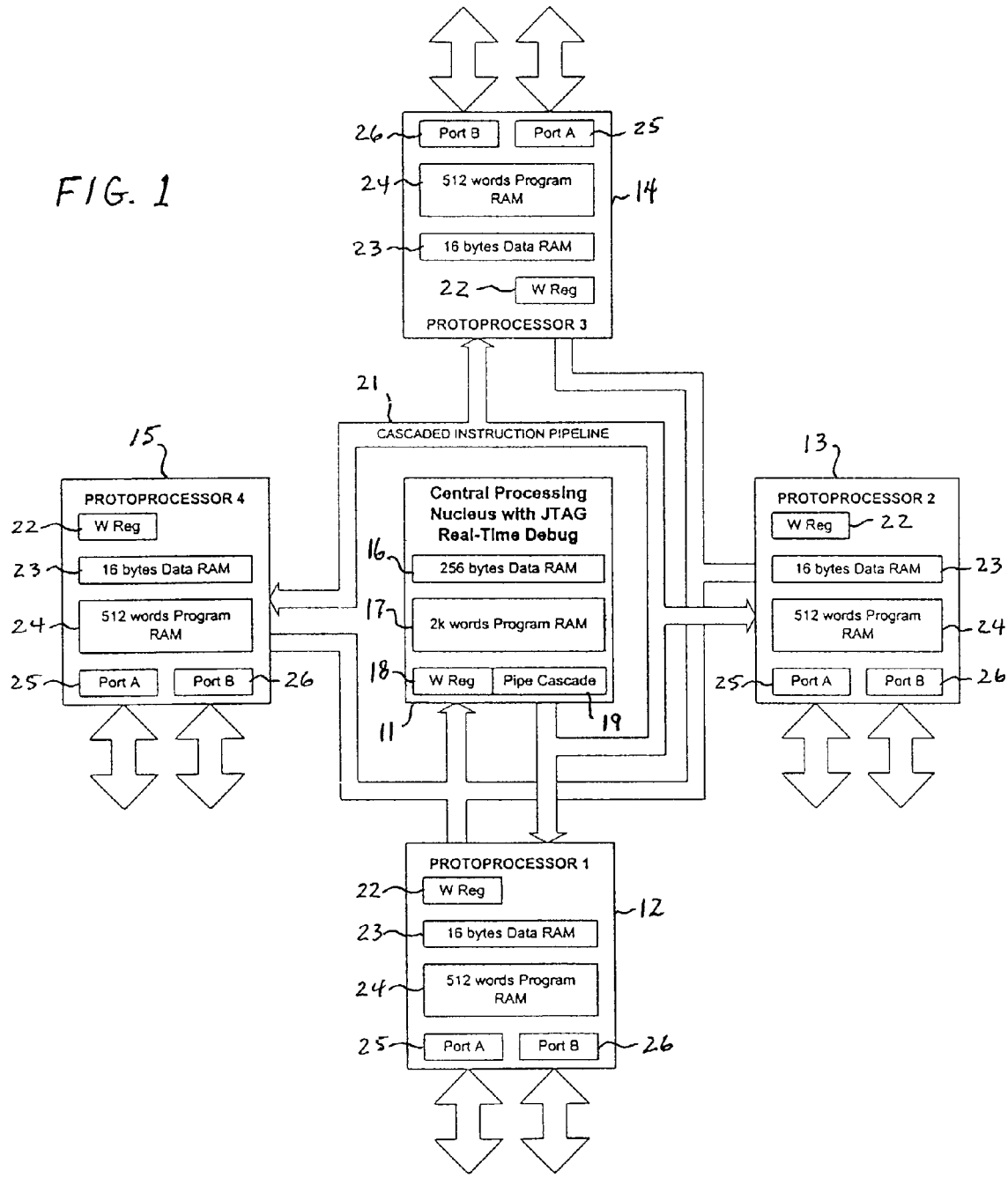
FIG. 1 is a simplified block diagram of an embodiment of the present invention in which a nucleus processor is arranged in a cascaded array with four proto-processors.

FIG. 1 is a simplified block diagram of an embodiment of the present invention in which a nucleus processor 11 is arranged in a cascaded array with four proto-processors 12–15. A proto-processor may be a microprocessor, microcontroller, or DSP whose instruction pipeline is at least partially cascaded from the instruction pipeline of a preceding nucleus processor and has the capability of executing its own proto-program from its proto-program memory. The nucleus processor may be, for example, a Reduced Instruction Set Computing (RISC) processor having 256 bytes of data RAM 16 and 2 k words of program RAM 17. In addition, the nucleus processor has a Working Register (W Reg) 18 that receives cascaded response data from the proto-processors. A pipe cascade mechanism 19 provides instructions to each of the proto-processors utilizing a cascaded instruction pipeline 21. The nucleus processor runs its own application program and in addition, acts as a supervisory processor, orchestrating all of the processors to work independently or to work together as a single unit. Although not shown in FIG. 1, each of the proto-processors may, in turn, serve as a nucleus processor for additional proto-processors stacked below it.

In FIG. 1, each of the proto-processors 12–15 is identical, but may be different in practice, as long as they are responsive to the partially decoded cascaded instructions from the nucleus processor. The proto-processors may be, for example, RISC processors or DSPs, depending on the application for which they are intended. In the embodiment pictured, they are RISC processors each having a W Reg 22, 16 bytes of data RAM 23, 512 words of program RAM 24, and two I/O ports, Port A 25 and Port B 26. A proto-processor's instruction set will generally be a subset of the nucleus processor, but not necessarily. The proto-processors operate under their own proto-program to animate or synthesize I/O functions which have been traditionally done in hard logic such as serial ports, timers, counters, pulse width modulators, etc. In some configurations, the proto-processors may have "hard" I/O attached to them such as timer/counter circuits.

Figure 2:
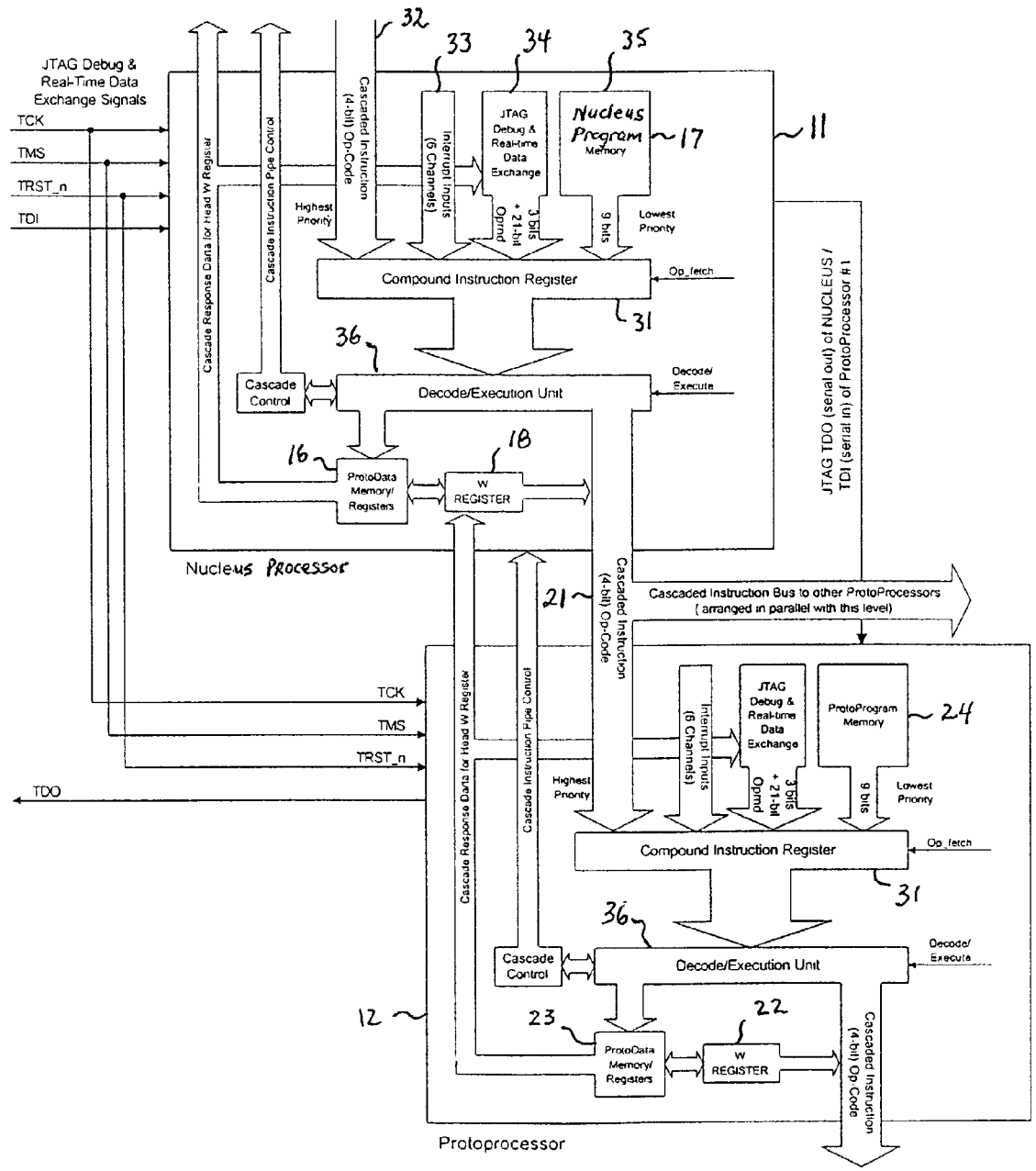
FIG. 2 is a more detailed block diagram of the nucleus processor 11 and a proto-processor 12 illustrating the flow of information between them in one embodiment of the present invention.

FIG. 2 is a more detailed block diagram of the nucleus processor 11 and a proto-processor 12 illustrating the flow of information between them in one embodiment of the present invention. The nucleus processor core and the proto-processor cores in the present invention are virtually identical with the exception of the amount of local program and data memory provided for a specific proto-processor or nucleus processor. The proto-processors may operate independently of the nucleus processor or as an extension of the nucleus processor, or both. In order for the proto-processors to operate as an extension of the nucleus processor, a novel real-time architecture uses a cascaded instruction pipeline whereby special instructions that are fetched and decoded by the nucleus processor are executed by designated or specified proto-processors under the nucleus processor. A cascaded instruction is an instruction consisting of a series of similar stages, each of which triggers or initiates the next to achieve a cumulative effect. These special cascaded instructions include, at a minimum, instructions necessary for the nucleus processor to access the resources (i.e., the program/data memories and registers) of the proto-processors below it as if the resources were its own.

The present invention integrates into its architecture, keys aspects of co-owned U.S. Pat. No. 3,347,368 entitled, "Microcomputing Device for Exchanging Data While Executing an Application" which is hereby incorporated herein by reference in its entirety. This patent describes an apparatus and method for exchanging data in which the device core receives application instructions from a first bus, and receives data exchange instructions from a second bus. Selection circuitry determines from which bus the core fetches instructions on any given cycle. The device core is able to perform data exchange subroutines without halting background processes.

In a classical, conventional processor, instructions enter the processor through an instruction bus, and are clocked in through a register. Instructions consist of an operation code (opcode) and an operand. The opcode is the portion of the instruction that specifies the type of instruction and the structure of the data on which it operates. The operand is the object of the instruction. The width of conventional registers is the same as the number of bits in the opcode (e.g., 8, 16, 32, etc.). In the present invention, however, a Compound Instruction Register 31 is utilized that is wider than the application instruction opcode to allow all the channels to come in at one time. Compound instructions include a 9-bit application program opcode and one or more opcodes for cascaded instructions, interrupt inputs, and real-time monitoring which are put into the register at the same time.

A compound instruction register 31 is roughly depicted in FIG. 2. The compound instruction register of each RISC processor is a parallel cascade of the processor's main instruction bus. The compound instruction register receives, in order of descending priority for execution: (1) decoded instructions from the nucleus processor above it via the novel cascade instruction bus; (2) interrupt inputs (6 channels); (3) real-time data exchange instructions from a JTAG debug circuit; and (4) program instructions for its main application from its local program memory. The compound instruction register is also a serial cascade of the nucleus processor instruction pipeline above it if the present, higher priority instruction was initiated by the nucleus processor above it.

The compound instruction register (INST_REG) is loaded during a valid OP_FETCH cycle with the INSTR_BUS which feeds into it. The INSTR_BUS includes CASINST_F [3:0], INTCODE [3:0], MONINST [2:0], and PDImx. CASINST_F is the cascaded instruction bus which is output from the nucleus processor. INTCODE are the encoded interrupt inputs. MONINST is a 3-bit real-time data exchange output of the JTAG debug and monitor circuit. PDImx is the mux of the proto-processors or nucleus processors (whichever the case may be) program data bus and the fixed LOI opcode (immediately after RESET, LOI is read into the instruction register during the first 2 clock cycles).

Figure 3:
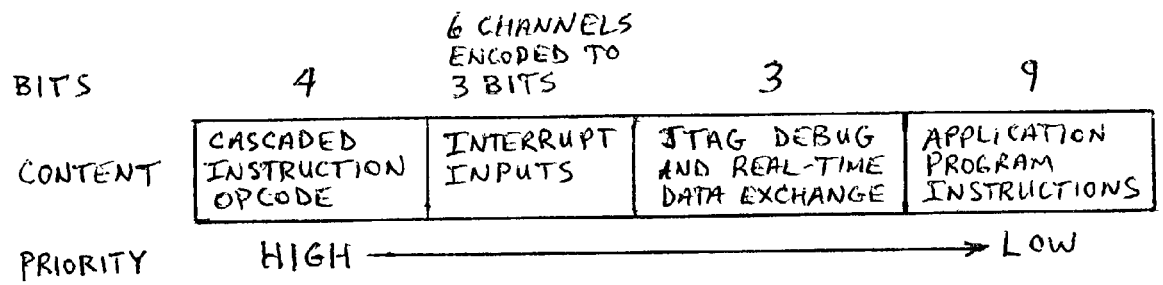
FIG. 3 is an illustration of an exemplary compound instruction utilized by the present invention.

FIG. 3 is an illustration of an exemplary compound instruction utilized by the present invention. The entire instruction may include 19 bits comprising, from highest priority to lowest priority, 4 bits for the cascaded instruction opcode, 3 bits for interrupt channels, 3 bits for JTAG debug monitoring and real-time data exchange, and 9 bits for the application program instructions. Thus, the individual instruction types are cascaded and prioritized within the overall instruction. The entire instruction is then evaluated as one large opcode. If an executable instruction is received in a higher priority position, anything in the lower priority positions is discarded.

In the normal mode, the nucleus processor is only interested in the normal application instructions. The nucleus processor fetches, registers, decodes, and executes the application instructions. However, when something else is presented in the bits in one of the other opcodes (i.e., the bits are not 0), such as an interrupt, then the additional bits have higher priority than the normal application instruction bits. The operands are still independent of the application opcode, but as noted above, the entire opcode is really much larger than 9 bits. As each clock cycle comes along, all of the bits are presented, fetched and evaluated at the same time. They are then prioritized and executed according to their priorities.

It should be noted that in addition to cascading the individual instruction types within the overall instruction, the individual instruction types are also cascaded sequentially in time according to their priorities. If the instruction that has been registered is a cascade instruction for bringing all the processors together, it has higher priority than the instruction that was fetched simultaneously off the main bus for the application program. The main program bus has the lowest priority, and the operands are grouped in priority order. Referring again to FIG. 2, it is shown that the cascaded instruction opcode 32 has the highest priority; interrupt inputs 33 have the second highest priority; monitoring (real-time data exchange) instructions 34 have the third highest priority; and main program instructions 35 have the fourth or lowest priority.

Cascade instructions are partially executed by the nucleus processor 11, and are then completed by the proto-processor 12 identified in the cascade operand. The nucleus processor fetches the instruction, registers it in the Compound Instruction Register 31, and decodes it in the Decode/Execution Unit 36. If the instruction includes an indication that the instruction is a cascade instruction, the nucleus processor does not execute it, but sends it to the proto-processors through the Cascaded Instruction Pipeline 21.

In the exemplary embodiment, the nucleus processor can simultaneously direct up to 9 proto-processors to respond because a 9-bit instruction word is used. Each bit position corresponds to one of the proto-processors. If a "1" appears in a particular bit position, that indicates that the associated instruction is to be executed by the proto-processor corresponding to that bit position. All of the proto-processors read all of the instructions, but only execute those that have a "1" in their corresponding bit position. For example, the most significant bit (MSB) is a "select" that tells the first proto-processor to execute the instruction. If the MSB is a "0", the first proto-processor ignores the instruction. If all of the bits are set to 0, then all of the proto-processors ignore the instruction. If all of the bits are set to 1, then all of the proto-processors execute the instruction.

Figure 4:
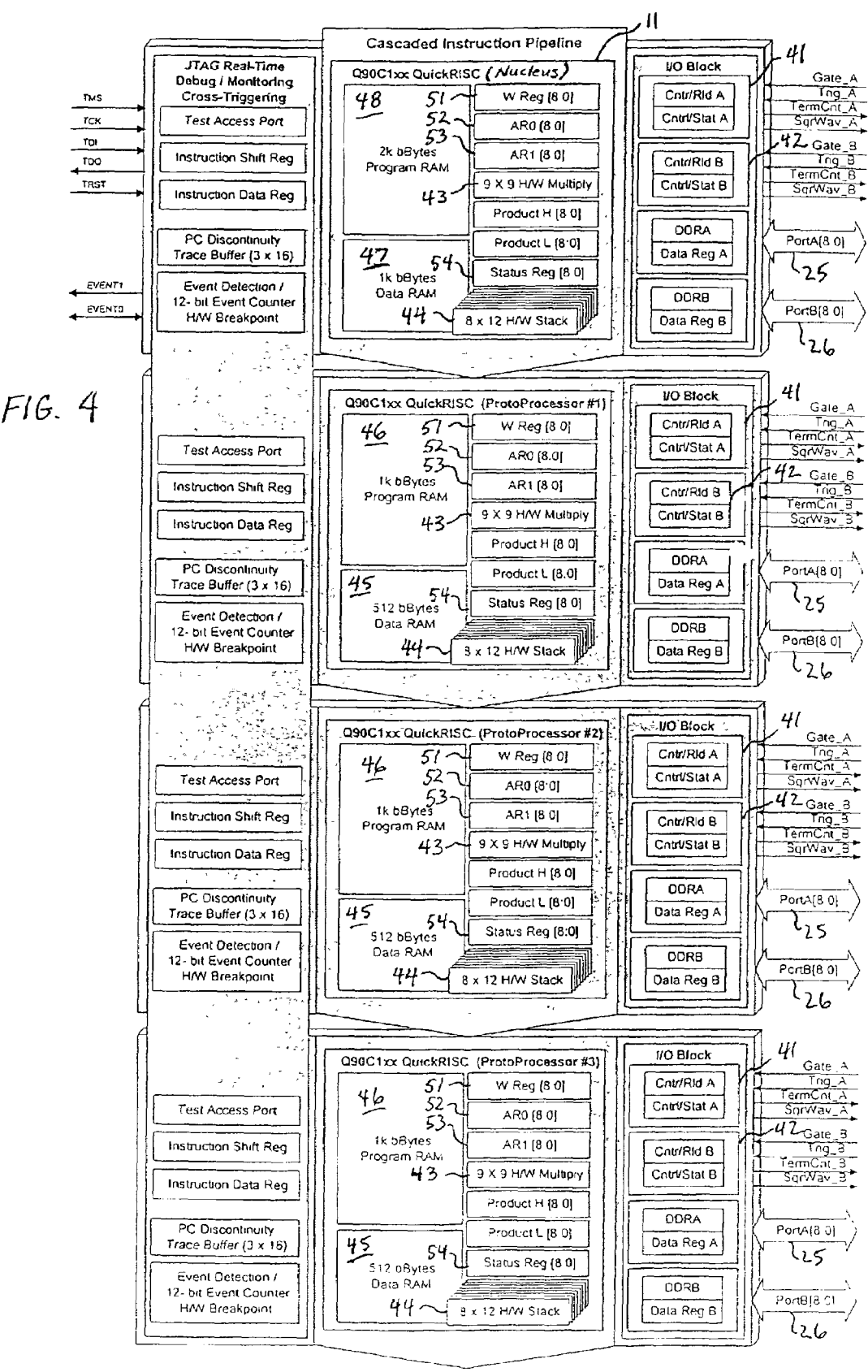
FIG. 4 is a block diagram of a hyperscalable 9-bit supercontroller in one embodiment of the present invention.

FIG. 4 is a block diagram of a hyperscalable 9-bit supercontroller in one embodiment of the present invention. This embodiment uses an array of four RISC processors arranged as a nucleus or head processor and three proto-processors. The four 9-bit RISC microcontrollers with a cascaded instruction pipeline allow the array supercontroller to operate as four individual microcontrollers, as a single hyperscalable unit, or any combination. In the illustrated exemplary embodiment, the nucleus processor and the proto-processors are identical except for the amount of program and data RAM. All the module ports and so on that have been instantiated are identical. Therefore, the process can cascade to additional levels if desired. In other words, the proto-processors can have subprocessors under them. They are function as plugs and sockets, labeled male and female sides (_M and _F in the signal). The bits are fetched and registered when the edge of each clock cycle arrives. The next cycle is "decode", and the next cycle is "execute". Fetch and decode are performed by the nucleus, while the execution stage is performed by the proto-processor. There are a progression of fetches, decodes, and executes in three pipelines for cascade instructions.

Each microcontroller is capable of up to 50 MIPS operation when implemented in a QuickLogic QL7180 QuickDSP Field Programmable Gate Array (FPGA) for a total of 400 million operations per second. The 9-bit RISC microcontroller cores have a modified Harvard architecture with two-stage instruction pipeline. This in combination with a dual-port data memory arrangement allows for single-cycle read-modify-write operations. The result is a very fast and compact 9-bit RISC microcontroller core.

Each controller includes two 9-bit programmable parallel I/O ports 25 and 26, and two programmable counter-timer circuits 41 and 42. Each controller has its own single-cycle, 9×9 hardware multiplier 43, 8-level hardware stack 44, 512 bBytes data RAM 45 and at least 1 k bBytes program RAM 46. The nucleus processor may have 1 k bBytes data RAM 47 and 2 k bBytes program RAM 48. The RAM blocks are configured for use as separate dual-port program RAM and data RAM. With this dual-port data RAM scheme, read-modify-write operations execute in a single clock cycle. Furthermore, a dual-port program RAM arrangement allows on-the-fly uploading of programs and program data tables into program RAM via an external source.

Another novel aspect of the controller core is a 9-bit wide instruction bus, data bus, and internal registers. The 9-bit bByte™ instruction and data width enables direct interfacing to 9-bit First-In-First-Out (FIFO) buffers and to 9-bit Digital-to-Analog (D/A) converters and Analog-to-Digital (A/D) converters (not shown). This 9-bit arrangement allows the controller to easily and naturally operate on the 9-bit data communicated with these devices. The processor uses an advanced indirect addressing mode utilizing dual auxiliary registers (AR0 and AR1) with auto post decrement and post increment capability. An external FLASH memory interface (not shown) enables the nucleus controller to program and access up to 256 k bBytes. Only 45 instructions allow easy memorization. Special cascaded instructions provide the nucleus controller with real-time access to any proto-processor resource as if it were its own, even while the proto-processor is running.

To do this, the new, real-time architecture utilizes the Cascaded Instruction Pipeline 21 whereby the nucleus controller 11 fetches and decodes a specific cascaded instruction, and the specified proto-controller completes its execution, even while running its own application. This strategy allows the designer to implement in software, functions which were traditionally performed in hardware logic. This makes the microcontroller more versatile and reusable in various applications. For example, an asynchronous serial port can now be implemented in software without burdening the nucleus processor. Other functions that can now be done in software include programmable pulse width modulators, serial communication interface (SCI) ports, FIFO buffers, intelligent I/O controllers, liquid crystal display (LCD) controllers, and the like.

In an embodiment with a nucleus and three proto-processors, 3 cascade selection bits come out of the nucleus processor, one for each proto-processor. A longer word may be utilized, but the extra bits are discarded. The nucleus processor can write a value to all three proto-processors simultaneously. In one embodiment, the nucleus processor has three separate ports coming back in to the nucleus to read from all three proto-processors. In another embodiment, the nucleus can only read from one proto-processor at a time. To conserve gates, this embodiment uses a selector on the read back cycle to enable the nucleus processor to select between the proto-processors for the read back cycle. A prioritized select signal causes a multiplexer (MUX) to select the response from the proto-processor with the highest priority. Thus, all of the proto-processors can be instructed to go out and read a certain location, but only the data from the highest priority proto-processor is actually read into the W register in the nucleus. Alternatively, all of the responses can be read back and then MUX'd internally when required.

It should be noted that there are situations in which it is desirable for all of the proto-processors to read at the same time even though the nucleus processor is not going to do anything with the data. Some functions such as interrupt flags are cleared when the proto-processors perform a read operation. So if it is desired to clear the flags, a read instruction can be sent to all the proto-processors. Also, there may be several parallel channels of associated A/D converters, and it is desired to clock and load up a register. This done by a read operation. The actual information can then be retrieved one at a time.

Each RISC controller includes a register set having a single Working Register (W Reg) 51, two Auxiliary Registers, (AR0) 52 and (AR1) 53, a Status Register (SR0) 54, a Program Counter (PC) 55 (not shown), and an eight-level by 12-bit hardware Stack 44. The W Register 51 is 9-bits wide and is used as a general-purpose register for moving data in and off chip, program memory, and data memory. The W Register can also be used to temporarily store the results of logical and mathematical operations. The Auxiliary registers AR1 and AR0 are also 9-bits wide and are primarily used as pointers to the first 512 locations in data memory when executing indirect instructions. This strategy is advantageous in that indirect instructions require only one clock cycle to execute since the source and destination address are contained in the specified auxiliary register. These registers also have the ability to be automatically post-incremented or post decremented allowing for faster program execution when performing loop counting or table operations. AR1 and AR0 may also be used as general-purpose registers.

Figure 5:
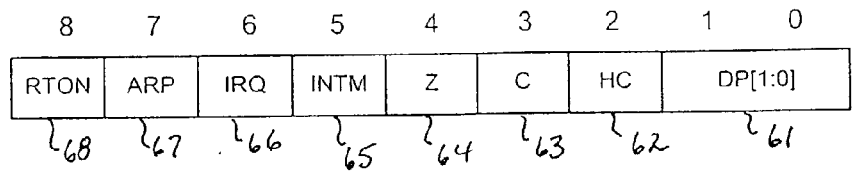
FIG. 5 is an illustration of an exemplary Status Register for use in the present invention.

Referring to FIG. 5, the Status Register 54 is a memory-mapped read/write register located at location 0x002 in the Q90's data space. The Status Register is nine bits wide and includes a Data Page pointer (DP) 61, Half Carry flag (HC) 62, Carry flag (C) 63, Zero flag (Z) 64, Interrupt Mask (INTM) 65, Interrupt Request flag (IRQ) 66, Auxiliary Register Pointer (ARP) 67, and Real-Time On (RTON) bit 68. With the exception of the INTM flag, the Status Register is not affected by reset.

The Data Page (DP) pointer 61 is a two-bit pointer used during all indirect addressing mode data memory instructions. DP specifies which 512 bbyte page in data memory the current indirect data instructions is to operated on. DP can be modified with the LDPK instruction as well by a MOV W instruction to the STATUS register which is memory mapped at location 0x002 in data memory. The direct addressing mode should normally be used for this operation unless the DP is already 00. The Half-Carry flag (HC) 62 is used in Binary Coded Decimal (BCD) arithmetic operations and is set to a logic one (1) whenever a carry occurs between bit 3 and bit 4 of the Arithmetic Logic Unit (ALU) during an ADD or SUB instruction. The HC flag is not affected by reset. The Carry flag (C) 63 is set when a carry occurs out of bit 8 of the ALU during an ADD or SUB instruction. It is may also be set or cleared during logical AND operations. Finally, a Set C (SEC) and a Clear C (CLC) instruction are provided for setting and clearing the C flag. The carry flag is not affected by reset.

The Zero flag (Z) 64 is set to one (1) when certain arithmetic, logical, shift, or load/store operations result in a value of zero; otherwise, the Z flag is set to zero (0) during operations which affect it. This flag is not affected by reset. The Interrupt Mask flag (INTM) 65 is used to enable acceptance of interrupt requests on the Interrupt Request (IRQ) pins. Setting the INTM flag to a logic one (1) enables acceptance of interrupt requests. Clearing the INTM flag not only disables interrupts, but also clears any pending interrupts. The Enable Interrupt (EINT) and Disable Interrupt (DINT) instructions are provided for enabling and disabling acceptance of interrupts respectively. The INTM flag is cleared to zero on reset. INTM has no effect on recognition of software or hardware breakpoints. The Interrupt Request (IRQ) flag 66 simply reflects whether or not there are any interrupts currently being requested. A one (1) indicates that there is an interrupt currently being requested.

The Auxiliary Register Pointer (ARP) 67 is used by indirect addressing mode instructions to select which auxiliary register is to be used during the currently executing indirect instruction. If the ARP=1, then the contents of AR1 is used as the source/destination address. If the ARP=0, then the contents of AR0 is used as the source/destination address. After power-up, the ARP must be initialized using either the LARP or MAR instruction since its initial state is undetermined. The Real-Time On (RTON) bit 68, if=1, indicates that the core is being operated in real-time mode. The application has no control of the setting and clearing of this bit. In a cascaded configuration, this bit can be sensed by a supervisor processor to determine what mode any proto-processor is being operated in.

The Program Counter (PC) 55 is 12-bits wide and is used to access the next instruction from program memory. The PC is reset to 000h on power-up or when the reset pin goes active. Upon reset or power-up, the core begins fetching instructions at location 000h. Upon acknowledgment of an interrupt or CALL instruction, the contents of the PC is pushed onto the top of the Stack 44 and the PC is loaded with the interrupt address. The RET instruction is used for both subroutines and interrupts. For interrupts, the EINT instruction should precede a RET if interrupts are desired upon return. Instructions that may affect the PC include B, BANZ, BCND, BRK, RET, RETB, CALL, TBLR, TBLWR, PUSH, POP (as defined below).

The present invention utilizes an eight-level deep by 12-bit wide hardware stack 44 for context save and restore operations. The 12-bit width of the stack facilitates saving or restoring of the PC 55 in a single clock cycle during interrupt acknowledge or interrupt return. In the exemplary embodiment, the top of the hardware stack is not directly accessible to the user except by way of the PUSH and POP instructions. If needed, the stack can be easily expanded to up to 64 levels deep with just a few additional logic cells.

The controller core in the present invention has a repetoire of only 45 instructions, making it easy to memorize. Most instructions have a number of different addressing modes which gives greater flexibility in how operations are carried out. These modes include Direct, Indirect, Immediate, and Implied or CPU control type instructions.

Direct Addressing Mode

The direct addressing mode utilizes the address given in the actual two-bbyte instruction as the destination and/or source address for the currently executing instruction. All direct address instructions are therefore two bbytes long. As with the indirect addressing mode, the destination can be specified as either the original source address or the W Register. The direct addressing mode instructions are given in Table 1, and some examples of their use are shown as follows:

EXAMPLES

| | | |
|---|---|---|
| add | W, VALUE | ;add W register to VALUE and store in VALUE |
| mov | PORT1, W | ;move PORT1 to W Register |
| and | W, VALUE, W | ;AND W with the contents of VALUE and store in W |
| ror | PORT0 | ;rotate right PORT0 and store in PORT0 |
| rol | PORT2, W | ;rotate left PORT2 and store result in W register |
| mov | W, PORT1 | ;mov W register to PORT1 |
| dec | VALUE | ;decrement VALUE and store in VALUE |
| inc | PORT0, W | ;increment PORT0 and store result in W register |
| sub | W, VALUE, W | ;subtract W from VALUE and store result in W |

| 8 | 7 | 6 | 5 | 4 | 3 | 2 | 1 | 0 |
|---|---|---|---|---|---|---|---|---|
| Direct with destination = Data memory ||||||||| 
| Opcode |||| 0 | 0 | 0 | Upr Adr ||
| Lower Data Address ||||||||| 
| Direct with destination = W Register ||||||||| 
| Opcode |||| 0 | 1 | 0 | Upr Adr ||
| Lower Data Address |||||||||

TABLE 1

Instruction Set (Direct Addressing)

| Mnem | Description | ~ | Instruction | Effect |
|---|---|---|---|---|
| ADD | Add W with memory and store in d | 2 | 0000 0 d 0 aa : aaaaaaaa | Z,H,C |
| SUB | Subtract W from and store in d | 2 | 0001 0 d 0 aa : aaaaaaaa | Z,H,C |
| SUBB | Subtract W with barrow and store in d | 2 | 0010 0 0 0 aa : aaaaaaaa | Z,H,C |
| AND | AND W with memory and store in d | 2 | 0011 0 d 0 aa : aaaaaaaa | Z |
| OR | OR W with memory and store in d | 2 | 0100 0 d 0 aa : aaaaaaaa | Z |
| XOR | XOR W with memory and store in d | 2 | 0101 0 d 0 aa : aaaaaaaa | Z |
| MOV | Move W to/from memory | 2 | 0110 0 d 0 aa : aaaaaaaa | Z |
| ROL | ROL d and store in d | 2 | 0111 0 d 0 aa : aaaaaaaa | Z,C |

TABLE 1-continued

Instruction Set (Direct Addressing)

| Mnem | Description | ~ | Instruction | Effect |
|------|-------------|---|-------------|--------|
| ROR  | ROR d and store in d | 2 | 1000 0 d 0 aa : aaaaaaaa | Z,C |
| DEC  | Decrement memory and store in d | 2 | 1001 0 d 0 aa : aaaaaaaa | Z |
| INC  | Increment memory and store in d | 2 | 1010 0 d 0 aa : aaaaaaaa | Z |
| ADDC | Add W with carry and store in d | 2 | 1011 0 d 0 aa : aaaaaaaa | Z,H,C |

Indirect Addressing Mode

The indirect addressing mode uses the contents of either Auxiliary Register 1 (AR1) 53 or Auxiliary Register 0 (AR0) 52 as the address pointer for accessing internal data memory. The current value of the Auxiliary Register Pointer (ARP) determines which auxiliary register is being used during the execution of an indirect addressing mode instruction. This addressing mode is very powerful because these instructions require only one clock cycle to execute. Like the direct addressing mode, the destination can either be the original source address or the W Register. Another feature that makes these instructions very powerful is that the instruction can specify whether the current auxiliary register is to be automatically post incremented or post decremented, and whether or not a new value is to be loaded into the ARP. These single-bbyte instructions allow several different operations to take place at the same time allowing application programs to execute in fewer clock cycles and with less program memory.

For indirect addressing, AR0 and AR1 are first set up as indirect address pointers using the following instructions:

| larp | #0 | ;load ARP with 0 (specify AR0) |
| lark | #VALUE, AR0 | ;load AR0 with the address of VALUE |
| lark | #PORT1, AR1 | ;load AR1 with the address of PORT1 |

The indirect addressing mode operations are provided below in Table 2, and indirect addressing mode instructions are provided in Table 3. Some examples of the use of indirect addressing instructions are shown as follows:

EXAMPLES

| add | W, *+, AR1, W | ;add W register to contents of address pointed to by the current auxiliary register, increment the contents of the current auxiliary register, load the ARP with 1, and store the result of the ADD operation in the W register |
| mov | *, AR0, W | ;move PORT1 to W register and load the ARP with 0 |
| and | W, *, AR1, W | ;AND W with the contents of VALUE, load the ARP with 1, and store result of the AND operation in the W register |
| ror | * | ;rotate right PORT1 and store the result of the ROR operation in PORT1 |
| mov | W, *-, AR0 | ;mov W register to PORT1, decrement AR1 so that it points to PORT0, and load ARP with 0 |
| dec | * | ;decrement VALUE and store in VALUE |

| 8 | 7 | 6 | 5 | 4 | 3 | 2 | 1 | 0 |
|---|---|---|---|---|---|---|---|---|
| Indirect with destination = Data memory | | | | | | | | |
| Opcode | | | 1 | 0 | M | I/D | AP | |
| Indirect with destination = W Register | | | | | | | | |
| Opcode | | | 1 | 1 | M | I/D | AP | |

Note:
See Table 2 for bit fields 2, 1, 0 explanation.

TABLE 2

Indirect Addressing Mode Operations

| M | I/D | AP | Operation |
|---|-----|----|-----------|
| 0 | 0 | 0 | No Operation |
| 0 | 0 | 1 | Not Used |
| 0 | 1 | 0 | Load AP with 0 |
| 0 | 1 | 1 | Load AP with 1 |
| 1 | 0 | 0 | Decrement AR(ARP) then load AP with 0 |
| 1 | 0 | 1 | Decrement AR(ARP) then load AP with 1 |
| 1 | 1 | 0 | Increment AR(ARP) then load AP with 0 |
| 1 | 1 | 1 | Increment AR(ARP) then load AP with 1 |

TABLE 3

Instruction Set (Indirect Addressing Mode)

| Mnem | Description | ~ | Instruction | Effect |
|------|-------------|---|-------------|--------|
| ADD  | Add W with memory and store in d | 1 | 0000 1 d ppp | Z,H,C |
| SUB  | Subtract W from and store in d | 1 | 0001 1 d ppp | Z,H,C |
| SUBB | Subract W with barrow and store in d | 1 | 0010 1 d ppp | Z,H,C |
| AND  | AND W with memory and store in d | 1 | 0011 1 d ppp | Z |
| OR   | OR W with memory and store in d | 1 | 0100 1 d ppp | Z |
| XOR  | XOR W with memory and store in d | 1 | 0101 1 d ppp | Z |
| MOV  | Move W to/from memory | 1 | 0110 1 d ppp | Z |
| ROL  | ROL d and store in d | 1 | 0111 1 d ppp | Z,C |
| ROR  | ROR d and store in d | 1 | 1000 1 d ppp | Z,C |
| DEC  | Decrement memory and store in d | 1 | 1001 1 d ppp | Z |
| INC  | Increment memory and store in d | 1 | 1010 1 d ppp | Z |
| ADDC | Add W with carry and store in d | 1 | 1011 1 d ppp | Z,H,C |

Note:
See Table 2 for description of indirect codes ppp.

W Immediate Addressing Mode

There are seven W immediate addressing mode instructions that use the bbyte immediately following the opcode to perform an arithmetic or logical operation on the W Register. Hence all immediate instructions are two bbytes long and require two clock cycles to execute. The result of the operation is always stored in the W Register. The immediate mode instructions are provided below in Table 4.

EXAMPLES

| | | |
|---|---|---|
| add | #1ABh, W | ;ADD immediate 1ABh to the W register |
| mov | #SPEED_1, W | ;move immediate SPEED_1 to W register |
| and | #MASK_B, W | ;AND immediate MASK_B with W and store result in W |
| cmp | #01Ch, W | ;compare #01Ch with W register |

W Immediate Addressing Format

| 8 | 7 | 6 | 5 | 4 | 3 | 2 | 1 | 0 |
|---|---|---|---|---|---|---|---|---|
| Opcode | | | 0 | 1 | 1 | 0 | 0 | |
| | | | Immediate Data | | | | | |

TABLE 4

Instruction Set (Immediate Addressing Mode)

| Mnem | Description | ~ | Instruction | Effect |
|---|---|---|---|---|
| ADD# | Add immediate 9-bit program word to W | 2 | 0000 0 0 1 00 : kkkkkkkkk | Z,H,C |
| SUB# | Subtract immediate 9-bit program word from W | 2 | 0001 0 0 1 00 : kkkkkkkkk | Z,H,C |
| SUBB# | Subtract with barrow immediate 9-bit program word to W | 2 | 0010 0 0 1 00 : kkkkkkkkk | Z,C |
| AND# | AND immediate 9-bit program word with W | 2 | 0011 0 0 1 00 : kkkkkkkkk | Z |
| OR# | OR immediate 9-bit program word with W | 2 | 0100 0 0 1 00 : kkkkkkkkk | Z |
| XOR# | XOR immediate 9-bit program word with W | 2 | 0101 0 0 1 00 : kkkkkkkkk | Z |
| MOV# | Move immediate 9-bit program word to W | 2 | 0110 0 0 1 00 : kkkkkkkkk | Z |
| ADDC# | Add immediate with carry 9-bit program word to W | 2 | 0111 0 0 1 00 : kkkkkkkkk | Z,H,C |

Branch and Call Instructions

Unconditional branch instructions include the B (unconditional) and CALL (branch to subroutine) instructions. The B (unconditional) instruction loads the direct address contained in the instruction into the program counter. The CALL instruction pushes the current value of the program counter onto the stack and then loads the program counter with the direct address contained in the CALL instruction. Both the B (unconditional) and CALL instructions require three clock cycles to execute since these instructions flush the instruction queue and the queue needs to be refilled after the branch is taken.

Conditional branch instructions include the B (cc) and BANZ instructions. These instructions are used to control the flow of program execution depending on the state of certain core flags.

B (cc) Instruction

| 8 | 7 | 6 | 5 | 4 | 3 | 2 | 1 | 0 |
|---|---|---|---|---|---|---|---|---|
| Opcode | | | Condition Code | | | Upper Addr | | |
| | | | Lower Address | | | | | |

There are seven condition codes available for use with the B cc instruction. The condition codes are given in Table 5 below.

TABLE 5

Jump Condition Codes

| 5 | 4 | 3 | Mnem | Jump Condition |
|---|---|---|---|---|
| 0 | 0 | 0 | GTE | If Carry or Zero flag = 1; W >= Memory |
| 0 | 0 | 1 | LT | If Carry and Zero flags = 0; W < Memory |
| 0 | 1 | 0 | NHC | If Half Carry flag is = 0 |
| 0 | 1 | 1 | NC | If Carry flag is = 0 |
| 1 | 0 | 0 | C | If Carry flag is = 1 |
| 1 | 0 | 1 | NZ | If Zero flag is = 0 |
| 1 | 1 | 0 | Z | If Zero flag is = 1 |
| 1 | 1 | 1 | | Always |

The BANZ instruction is extremely useful for implementing efficient loop control operations. Either of the auxiliary registers can be used as a loop counter whereby its value is tested for zero (0) on each pass. If the value of the specified auxiliary register is not equal to zero (0) then a branch is taken to the address specified in the instruction. The BANZ instruction implicitly post-decrements the specified auxiliary register. The jump instructions are provided below in Table 6.

EXAMPLES

| | | |
|---|---|---|
| RESET: | | |
| b | INITIALIZE | ;jump unconditionally to initialization |
| INITIALIZE: | | |
| call | SETUP_LCD | ;jump unconditionally to LCD setup subroutine |
| mov | PORT0, W | ;read PORT0 into W |
| cmp | W, #034 h | ;compare W with #034h |
| b | LT, LCD_TST | ;if W is less than 034h then jump to LCD_TST |

-continued

| | | |
|---|---|---|
| DISPLAY_MSG: | | ;display message subroutine |
| larp | #0 | ;load ARP with 0 |
| lrlk | #HELLO_MSG, AR0 | ;load address of hello message into AR0 |
| lrlk | #HELLO_END - HELLO_MSG, AR1 | ;load length of hello message into AR1 |
| LCD_WRITE_LOOP: | | |
| tblr | *+, AR0 | ;move data stored at address given in AR0 into the W register and automatically post increment AR0 |
| mov | W, LCD_DATA | ;mov the character out to the LCD |
| banz | *-, AR1, LCD_WRITE_LOOP | ;if AR1 not equal to 0 then jump to LCD_WRITE_LOOP and automatically post-decrement AR1 |

TABLE 6

Jump Instructions

| Mnem | Description | ~ | ~ | Instruction | Effect |
|---|---|---|---|---|---|
| B cc | Branch conditionally | 2 | 3 | 110 ccc aaa : aaaaaaaa | n/a |
| B | Branch unconditionally | 2 | 3 | 110 111 aaa : aaaaaaaa | N/a |
| CALL | Jump unconditionally to subroutine | 3 | 3 | 1110 0 0 aaa : aaaaaaaa | n/a |
| BANZ | Jump if AR(ARP) | 2 | 3 | 1110 1 n aaa : aaaaaaaa | n/a |

TABLE 6-continued

Jump Instructions

| Mnem | Description | ~ | ~ | Instruction | Effect |
|---|---|---|---|---|---|
| | not zero, decrement AR(ARP) and load n into ARP | | | | |

Note: See Table 5 for description of condition codes ccc.

TABLE 7

Multiply Instructions

| Mnem | Description | ~ | Instruction | Effect | Note |
|---|---|---|---|---|---|
| MUL | Multiply W × AR(ARP) and store 18-bit result in memory mapped product register | 1 | 111110000 | n/a | |
| MULK | Multiply W × immediate K and store 18-bit result in memory mapped product register | 1 | 111110001 | n/a | |

TABLE 8

Implied and Immediate Instructions

| Mnem | Description | ~ | Instruction | Effect | Note |
|---|---|---|---|---|---|
| NOP | No operation; same as MAR* | 1 | 111100000 | n/a | |
| LARP | Load Auxiliary Register Pointer with n (0, 1) | 1 | 11110001n | n/a | |
| MAR | Modify Auxiliary Register ARn(ARP)*, *+, or *− | 1 | 111100ppp | n/a | |
| TBLR | Load W with data located at program memory addressed by {PPAGE :AR[ARP]} | 3 | 111101000 | n/a | |
| LOI | Loiter at current PC | 1 | 111101001 | n/a | |
| RET | Return from subroutine | 1 | 111101010 | n/a | |
| RETB | Return from breakpoint | 1 | 111101011 | n/a | |
| TBLW | Store W at program location pointed to by {PPAGE :AR[ARP]} | 4 | 111101100 | n/a | |

TABLE 8-continued

Implied and Immediate Instructions

| Mnem | Description | ~ | Instruction | Effect | Note |
|---|---|---|---|---|---|
| RPTK | Repeat next instruction K# of times (1–256) | 2 | 111101101 | n/a | 1 |
| DINT | Disable Interrupts | 1 | 111101110 | I | |
| EINT | Enable Interrupts | 1 | 111101111 | I | |
| POP | POP lower 9 bits of Stack into W register | 1 | 111110010 | n/a | |
| PUSH | PUSH W onto lower 12 bits of Stack | 1 | 111110011 | n/a | |
| BRK | Software break instruction | 1 | 111110100 | n/a | |
| SWAP | Swap W[7:4] with W[3:0] | 1 | 111110101 | n/a | |
| CLC | Clear carry flag | 1 | 111110110 | C | |
| SEC | Set carry flag | 1 | 111110111 | C | |
| LDPK | Load data pointer DP with immediate 2 bits | 1 | 1111110xx | n/a | |
| LRLK | Load ARn with 9-bit immediate value | 2 | 11111110n | n/a | |
| NOWR | No write during next instruction (used for CMPR) | 1 | 111111111 | n/a | 2 |

Notes:
1. Not implemented
2. This instruction can be used to create a CMPR (compare) instruction if immediately followed by a SUB instruction as the results are not stored anywhere except that the flags are updated. It can also be used to create a MSB and LSB test of the W register if immediately followed by a ROR or ROL instruction where the results of the test are rotated into the C flag but leaves the original source data and W register undistured.

Cascaded Instructions

The exemplary embodiment of the present invention described herein provides the ability to scale the Q90Cxxx family of processors into a more powerful microcontroller by cascading one or more additional (Q90 proto-processors) to the Q90 nucleus instruction pipeline. By cascading in this manner, the nucleus processor has real-time access to all the internal resources of the cascaded proto-processors under it. Special instructions are provided in the instruction repertoire for this purpose.

The cascaded pipeline instructions facilitate the communication of the processed information. They also provide supervisory control to the nucleus. For example, the nucleus is able reset the proto-processors, and direct what they do at any given instant using the WORM instruction and data read (PRDAT) and data write (PWDAT). The cascaded pipeline instructions also enable application applets to be dynamically loaded into each proto-processor. Thus, the proto-processors can be used to perform dedicated tasks such as I/O functions, or they can be coprocessors to offload data crunching and processing from the nucleus. For example, the proto-processors may be RISC processors or digital signal processors (DSPs) where you can have multiple channels of analog data being processed in real time.

Instruction tables show groups of channels and what each bit pertains to. It should be understood that the present invention utilizes a compound instruction bus to input instructions to the nucleus processor. This is not the same as the cascaded instruction pipeline. While the compound instruction bus is the mechanism that brings the compound instructions to the nucleus processor, the cascaded instruction pipeline is the mechanism that carries cascaded instructions from the nucleus processor to the proto-processors. The compound instruction bus enables a compound instruction with prioritized portions to be carried on a single bus. As the 19-bit compound instruction is fetched from the compound instruction bus into the compound instruction register 31, it is passed to the Decode/Execution unit 36 where the highest priority portion of the instruction having a value other than zero (0) is executed. At the same time, the operation of the overall array is cascaded from the nucleus processor 11 to one or more proto-processors 12 when the decoded instruction indicates that it is to be executed by a proto-processor. Thus, the operation of the overall array is cascaded in two dimensions.

The dissemination of the compound instructions is controlled by pointers. The pointers are built from the Cascade Page (CPAGE) and the ARs which are each 9 bits. The pointers are assembled by concatenating the CPAGE with a specified $A_n$. The $AR_n$ is designated by a 1-bit flag known as an ARP. During the execution cycle, the address is created from the contents of the CPAGE and the $AR_n$ at the time of execution. This is all set up ahead of time so that when the compound instruction is fetched, it is decoded and sent in one clock cycle.

A brief description of each cascaded instruction is given below.

PSTOP, PGO

The proto-processor stop (PSTOP) and proto-processor go (PGO) instructions are used to assert and hold the specified proto-processor(s) in a reset state. PGO clears the specified proto-processors from reset. PSTOP and PGO should only be used in cases where there is already a program in program memory. PSTOP is two bbytes long with the second bbyte being the mask which specifies which proto-processor(s) are to be responsive. Bit 0 of the mask is not used. Bit 1 pertains to proto-processor 1; B2 to proto-processor 2; and so on.

EXAMPLES

| | | |
|---|---|---|
| PSTOP | P1, P3, P4 | ;forces and holds reset on proto-processor 1, 3 and 4 |
| PGO | P1, P4 | ;brings proto-processors 1 and 4 out of reset |

PWORM

The PWORM instruction is used to write an op-code into one or more proto-processor program memory locations and then forces the proto-processor(s) to jump to the address just written. Normally, after power-up, the proto-processor(s) are WORMed with a LOI (loiter) instruction to the last location of their internal program RAM. The program address written is the concatenation of the nucleus processor's cascade page (CPAGE) register as the high order program address [18:9] and the nucleus processor's AR[ARP] as the low order program address [8:0]. The PWORM instruction is two bbytes long with the second bbyte being the proto-select mask register.

EXAMPLES

| mov | #LOI_INSTR, w | ;move #0x1E9 into w register |
| PWORM | w,*,P1,P2,P3,P4 | ;make all protos worm to their program address specified by the nucleus processor 18-bit {CPAGE[8:0], AR[ARP] } |

PWDAT

The PWDAT instruction writes the contents of the nucleus processor's W Register to the data memory of the proto-processor(s) specified by the nucleus processor's {CPAGE[8:0], AR[ARP]}. The PWDAT instruction is two bbytes long with the second being the mask which specifies which proto-processors are to be responsive.

EXAMPLES

| mov | #0x137, w | ;load nucleus w with the value to be written |
| PWDAT | w,*,P1,P4 | ;write it to P1 and P4's data memory pointed to by nucleus {CPAGE[8:0], AR[ARP] } |

PRDAT

The PRDAT instruction reads the specified proto-processor's data memory specified by the nucleus processor's {CPAGE[8:0], AR[ARP]}. The PRDAT instruction is three bbytes in length. The second bbyte is the mask which specifies which proto-processor(s) are to be responsive. Bits 1 thru 4 correspond to the specified responsive proto-processors respectively. The third bbyte is actually the same as the PLDWC instruction which loads whatever happens to be on the cascade response bus, at the time, into the nucleus processor's W Register.

EXAMPLE

| PRDAT | P3, w, * | ;read P3 data address specified by nucleus {CPAGE[8:0], AR[ARP] } and load it into nucleus processor's W register |

PTBLR

The PTBLR instruction reads the specified proto-processor's program memory specified by the nucleus processor's {CPAGE[8:0], AR[ARP]}. The PTBLR instruction is three bbytes in length. The second bbyte is the mask which specifies which proto-processor(s) are to be responsive. Bits 1 thru 4 correspond to the specified responsive proto-processors respectively. The third bbyte is actually the same as the PLDWC instruction which loads whatever happens to be on the cascade response bus, at the time, into the nucleus processor's W Register.

EXAMPLE

| PTBLR | P2,w,* | ;read P2 program address specified by nucleus {CPAGE[8:0], AR[ARP] } and load it into nucleus processor's W register |

PTBLW

The PTBLW instruction writes the contents of the nucleus processor's W Register to the program memory of the proto-processor(s) specified by the nucleus processor's {CPAGE[8:0], AR[ARP]}. The PTBLW instruction is two bbytes long with the second being the mask which specifies which proto-processor(s) are to be responsive.

EXAMPLES

| mov | #0x137, w | ;load head w with the value to be written |
| PTBLW | w,*,P1,P4 | ;write it to P1 and P4's prog. memory pointed to by nucleus {CPAGE[8:0], AR[ARP] } |

PCALL

The PCALL instruction induces the specified proto-processor(s) to call the subroutine specified in the nucleus processor's {CPAGE[8:0], AR[ARP]}. Responsive proto-processors behave as if they called the subroutine themselves. After completion of their respective subroutines, responsive proto-processors should set a pre-designated bit to indicate completion. An interrupt control bit is also provided in the proto-processor's interrupt register which can be used to specifically assert an interrupt on the nucleus to service retrieving the results (if any) of the original PCALL. The PCALL instruction is two bbytes in length with the second bbyte being the mask which specifies which proto-processor(s) are to be responsive to the PCALL instruction.

EXAMPLE

| PCALL | *,P1,P2,P3 | ;proto-processors P1, P2, P3 commanded to CALL their subroutine located at the program address specified by the nucleus processor's {CPAGE[8:0], AR[ARP] } |

PLDWC

The PLDWC instruction loads whatever is on the cascaded proto-processor response bus at the time of execution into the nucleus processor's W Register. Normally, the PLDWC instruction is not ever used explicitly by the user's application. At assembly time, the PLDWC instruction is automatically appended to the PRDAT and PTBLR instruction to form their respective 3-bbyte length.

The cascade instructions are given in Table 9 below with their respective opcodes.

TABLE 9

Implied and Immediate Cascade Instructions

| Mnem | Description | ~ | Instruction | Effect | Note |
|---|---|---|---|---|---|
| PSTOP | Stop (hold in reset) the specified proto-processor(s) | 2 | 111001000 | n/a | |
| PGO | Go (bring out of reset) specified proto-processor(s) | 2 | 111001001 | n/a | |
| PLDWC | Load W with cascade results from PTBLR or PRDAT | 1 | 111001010 | n/a | 3 |
| PWDAT | Write W to specified proto-processor(s) data memory using {CPAGE, AR[ARP]} as data pointer | 5 | 111001011 | n/a | |
| PRDAT | Read specified protoprocessor(s) data memory using {CPAGE, AR[ARP]} as data pointer | 4 | 111001100 | n/a | 4 |
| PWORM | WORM specified protoprocessor(s) to proto address specified by using {CPAGE, AR[ARP]} as program pointer. Contents of W is written there followed by jump there | 5 | 111001101 | n/a | 5 |
| PTBLW | Write W to specified proto-processor(s) program memory using {CPAGE, AR[ARP]} as program memory pointer | 5 | 111001110 | n/a | |
| PTBLR | Write W to specified protoprocessor(s) data memory using {CPAGE, AR[ARP]} as data pointer | 4 | 111001111 | n/a | 4 |
| PCALL | Protoprocessor (s) call subroutine instruction | 4 | 111111110 | n/a | |

Notes:
1. PLDWC is usually not used explicitly by the user but is appended onto last bbyte of either PRDAT or PTBLR during assembly time. The result is a 3-bbyte instruction.
2. PRDAT is followed by a 9-bit # mask which specifies which protos are to respond. Protos are numbered 4–1 and the corresponding bit is set in the second bbyte. Bit 0 is always 0.
3. PWORM is followed by a 9-bit immediate mask as in Note 4 above. Usually upon reset, all protos will be WORM'd with the LOI in the W register to the PRAM location and just hang out there until needed.

Figure 6:
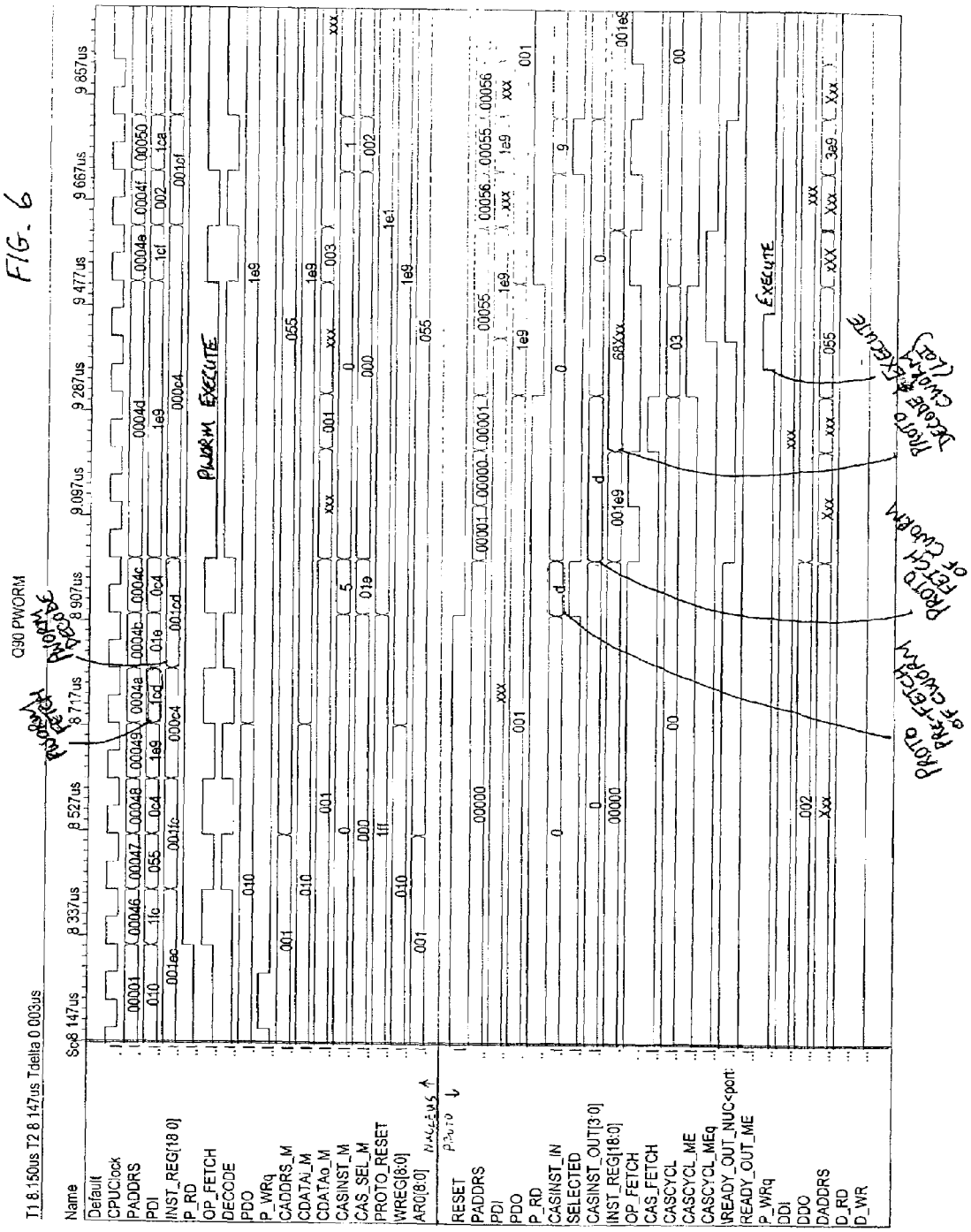
FIG. 6 is a simulation timing diagram illustrating the relationship of nucleus processor signal timing with respect to responsive proto-processor signal timing during execution of the PWORM instruction.

FIG. 6 is a simulation timing diagram illustrating the relationship of nucleus processor signal timing with respect to responsive proto-processor signal timing during execution of the PWORM instruction.

Figure 7:
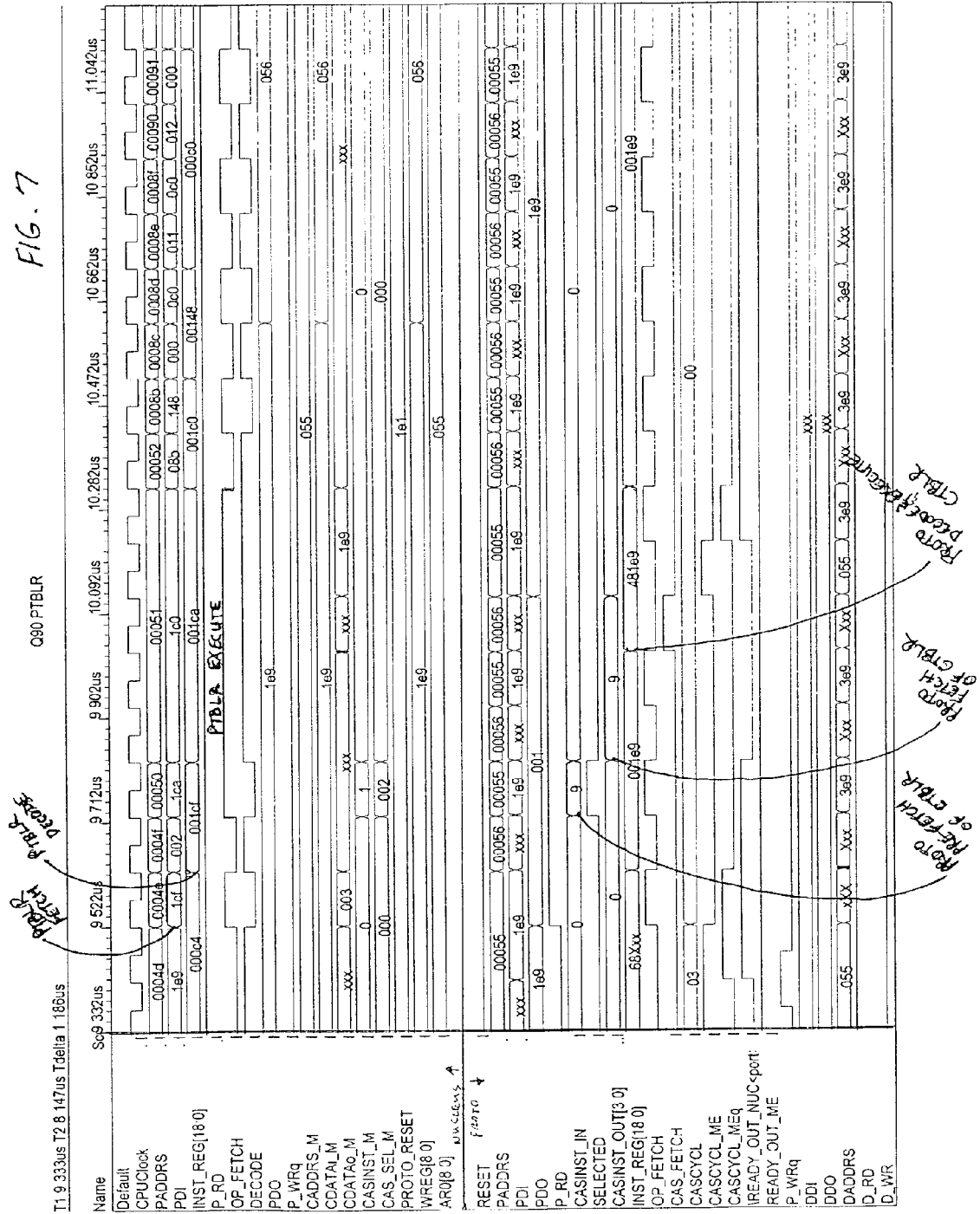
FIG. 7 is a simulation timing diagram illustrating the relationship of nucleus processor signal timing with respect to responsive proto-processor signal timing during execution of the Proto Table Read (PTBLR) instruction.

FIG. 7 is a simulation timing diagram illustrating the relationship of nucleus processor signal timing with respect to responsive proto-processor signal timing during execution of the Proto Table Read (PTBLR) instruction.

Figure 8:
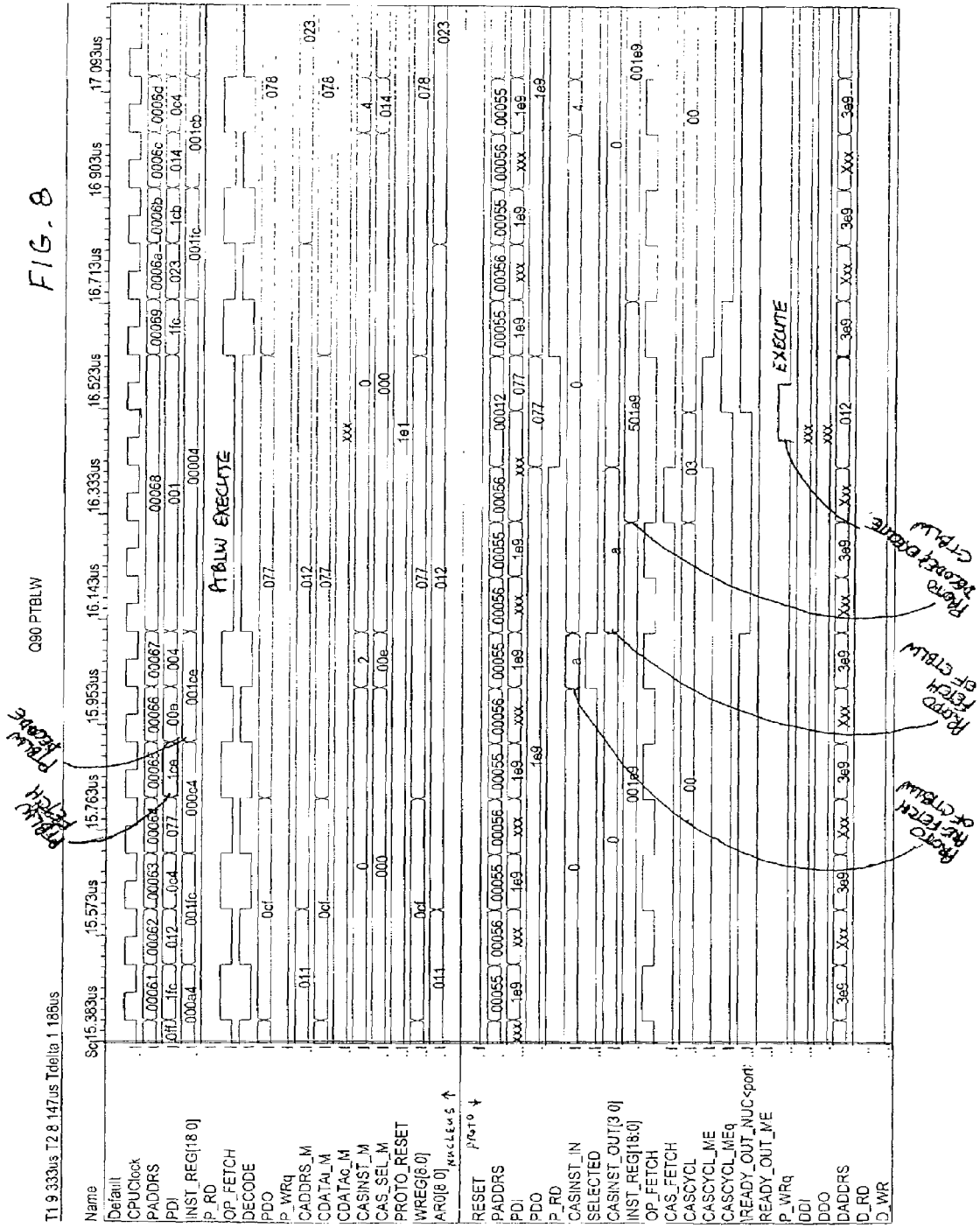
FIG. 8 is a simulation timing diagram illustrating the relationship of nucleus processor signal timing with respect to responsive proto-processor signal timing during execution of the Proto Table Write (PTBLW) instruction.

FIG. 8 is a simulation timing diagram illustrating the relationship of nucleus processor signal timing with respect to responsive proto-processor signal timing during execution of the Proto Table Write (PTBLW) instruction.

Figure 9:
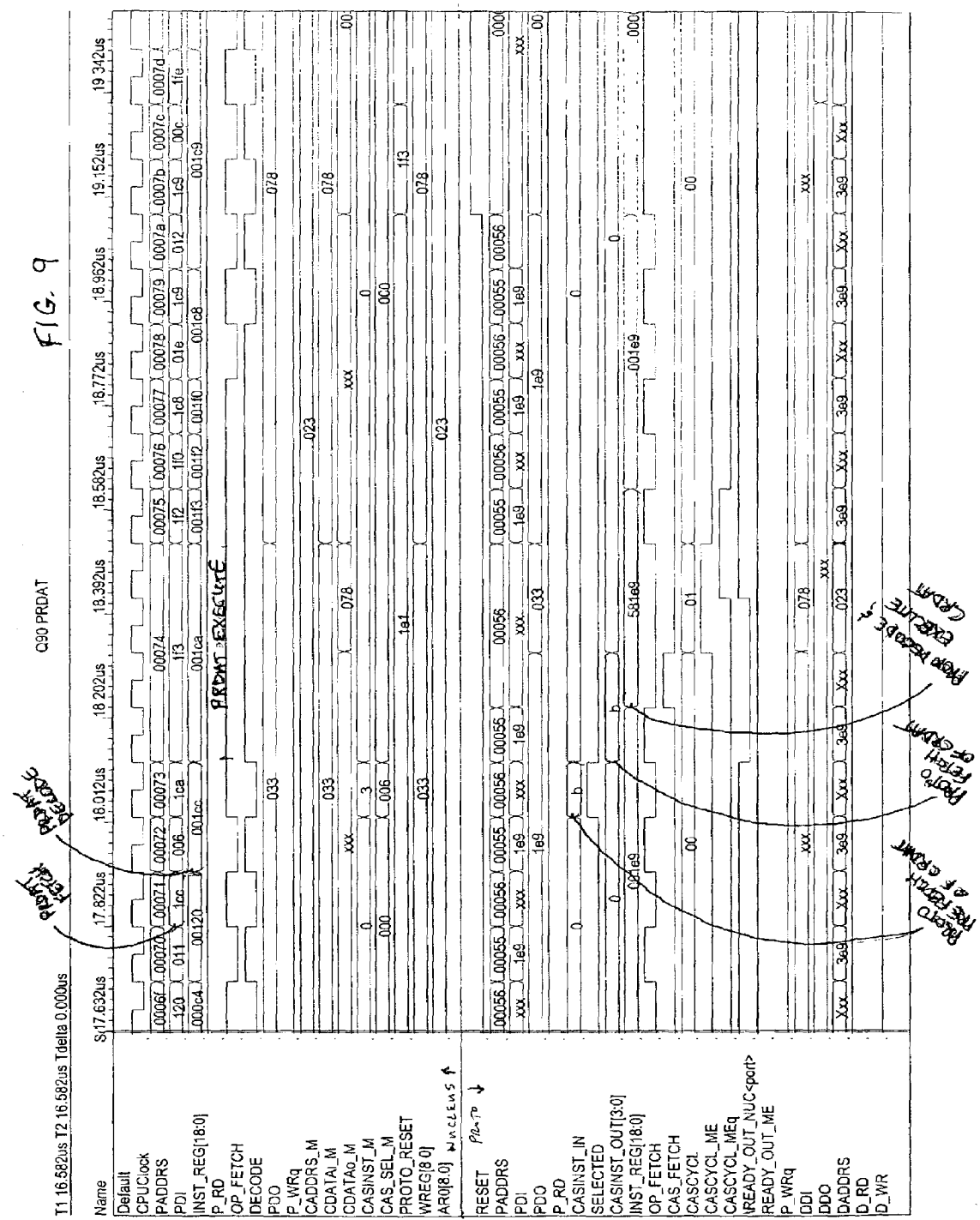
FIG. 9 is a simulation timing diagram illustrating the relationship of nucleus processor signal timing with respect to responsive proto-processor signal timing during execution of the Proto Read Data (PRDAT) instruction.

FIG. 9 is a simulation timing diagram illustrating the relationship of nucleus processor signal timing with respect to responsive proto-processor signal timing during execution of the Proto Read Data (PRDAT) instruction.

Figure 10:
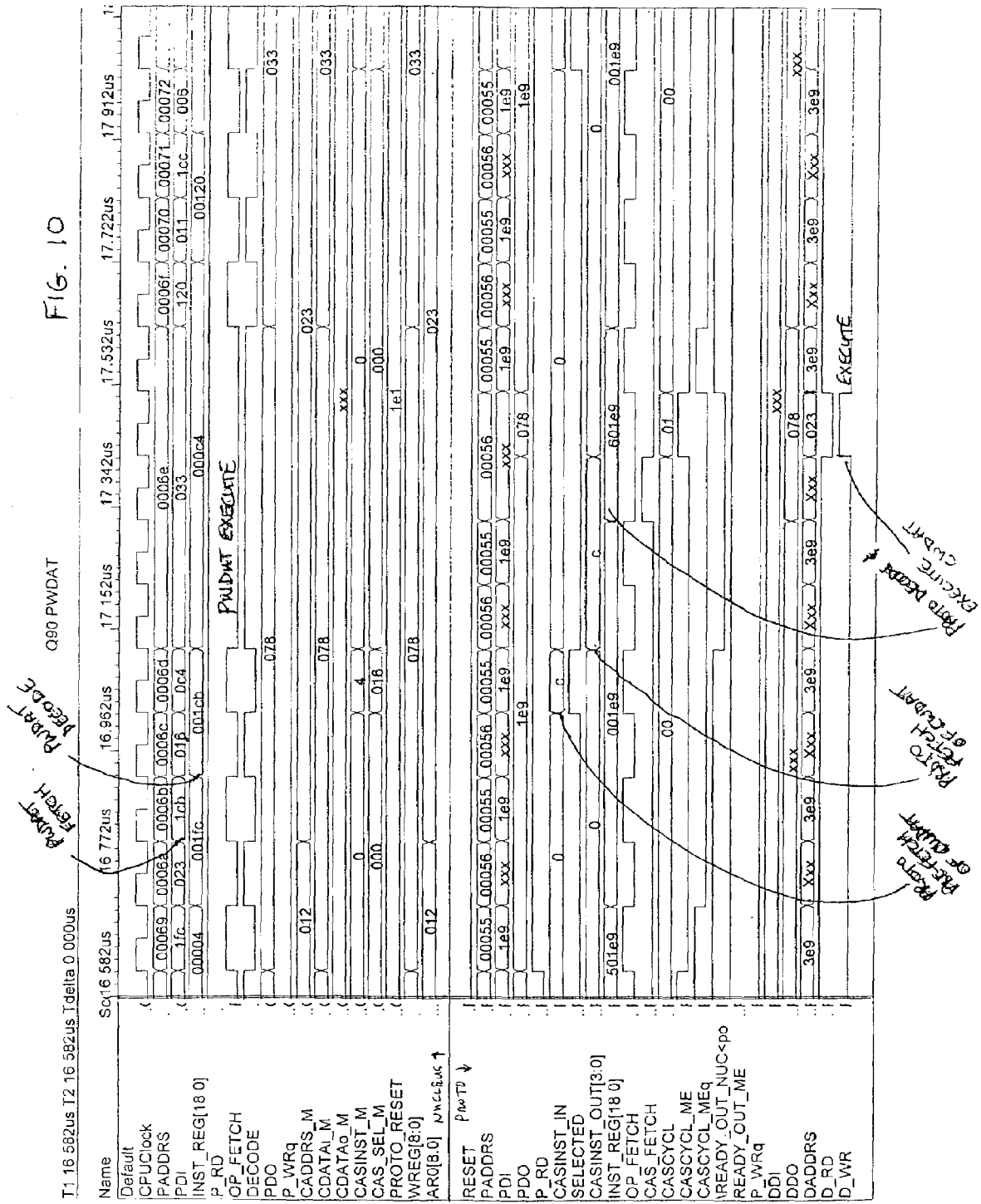
FIG. 10 is a simulation timing diagram illustrating the relationship of nucleus processor signal timing with respect to responsive proto-processor signal timing during execution of the Proto Write Data (PWDAT) instruction.

FIG. 10 is a simulation timing diagram illustrating the relationship of nucleus processor signal timing with respect to responsive proto-processor signal timing during execution of the Proto Write Data (PWDAT) instruction.

Figure 11:
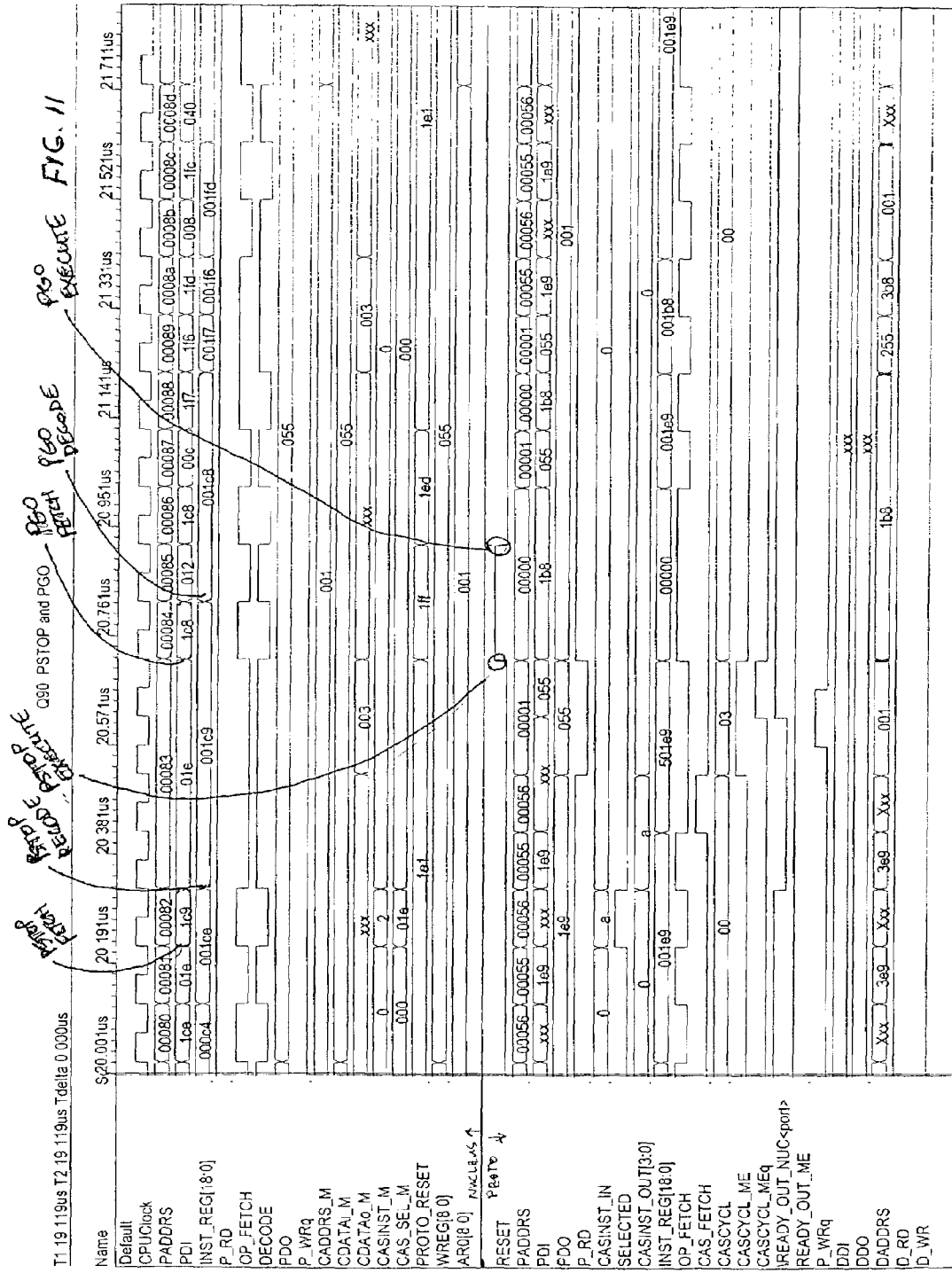
FIG. 11 is a simulation timing diagram illustrating the relationship of nucleus processor signal timing with respect to responsive proto-processor signal timing during execution of the Proto Stop (PSTOP) and Proto Go (PGO) instructions.

FIG. 11 is a simulation timing diagram illustrating the relationship of nucleus processor signal timing with respect to responsive proto-processor signal timing during execution of the Proto Stop (PSTOP) and Proto Go (PGO) instructions.

Figure 12:
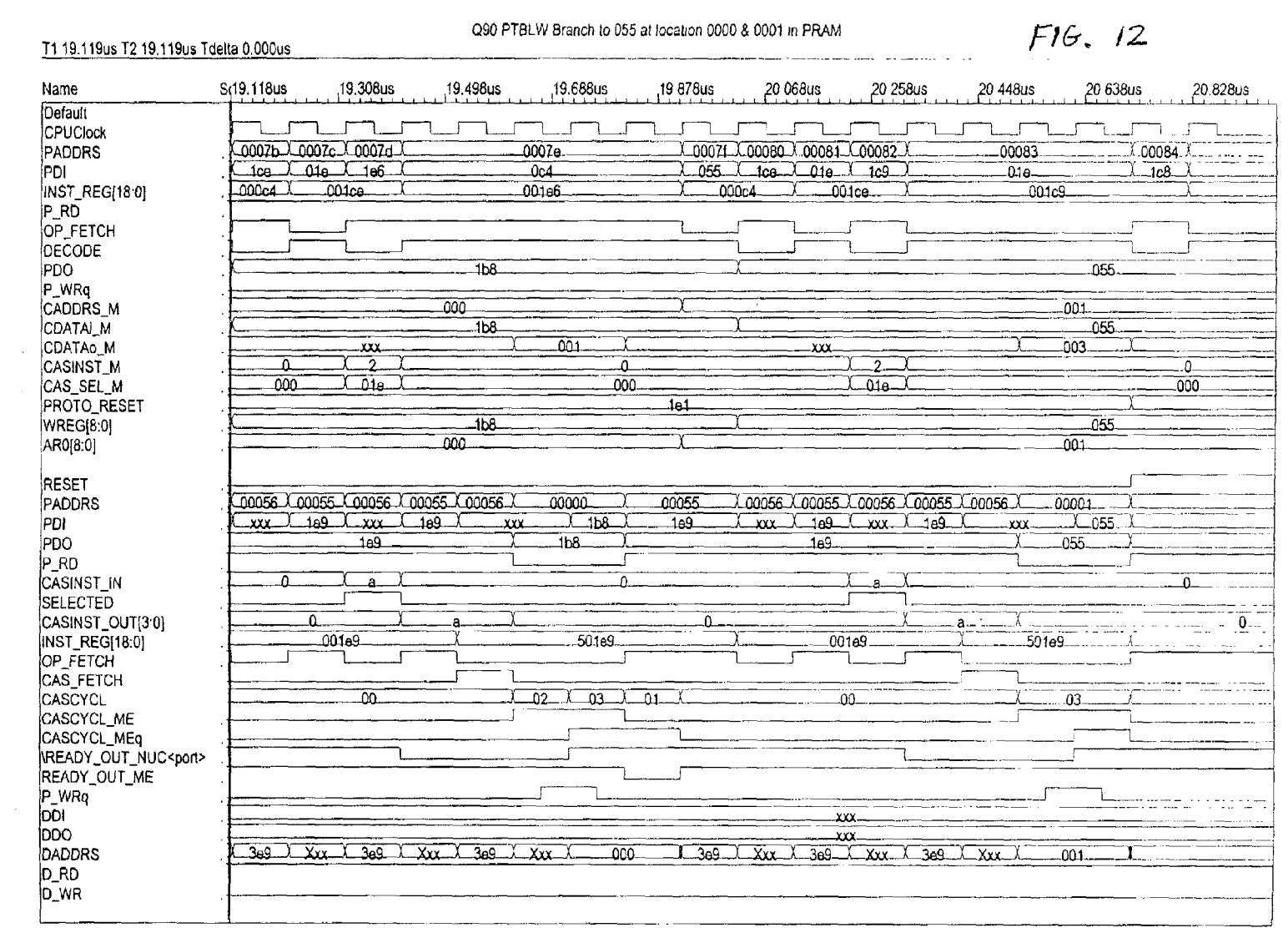

FIG. 12 is a simulation timing diagram illustrating the relationship of nucleus processor signal timing with respect to responsive proto-processor signal timing during execution of the PTLBW of a B(ranch) instruction sequence to locations 0000 and 0001 (reset vector).

Thus, the present invention includes a cascaded instruction pipeline in which one processor fetches and decodes instructions, and another processor executes them. The pipeline causes multiple processors to operate as a single processor. The instruction is assembled during the decode cycle of the nucleus processor, and is presented to one or more of the proto-processors for execution. In one instance, the proto-processors work together with the nucleus processor in a way such that most of the time, the nucleus is performing its own program, but can instantaneously and dynamically scale the process out to perform a specific task or function, and then shrink back down to normal operation. To do that, the nucleus can grab as many proto-processors as it needs. The invention provides the ability to take an off-the-shelf part and construct an array of processors, with the proto-processors performing the hardware functions in software.

The resulting architecture of the present invention provides a microcomputer that is scalable, depending on the number of proto-processors available. Proto-processors can be programmed in software to implement complex Input/ Output (I/O) control functions which have been traditionally implemented in hard logic without burdening the nucleus processor. In the past, to perform all the I/O tasks in software was too burdensome for a single head processor. Furthermore, in schemes where multiple processors were used, there was still a large amount of software overhead involved when using traditional Direct Memory Access (DMA) methods. The present invention solves these problems.

As described above, the solution in the present invention is to integrate the peripheral functions, that are performed in software as individual microprocessors, directly into the functioning of the nucleus processor, making them a single, hyperscalable processor. The cascaded instruction pipeline solves the problems of the prior art. The cascaded instruction pipeline architecture enables the processors to act as one, and to become part of the nucleus. The processors may act as individuals in one situation, and may act as a single processor in another. The process is dynamic and instantaneous. The processor is described as being hyperscalable because in one instant, the processors are all individually running their own resident applications, and in the next instant, when the nucleus executes a specific cascaded pipeline instruction, the processors become one.

Figure 13:
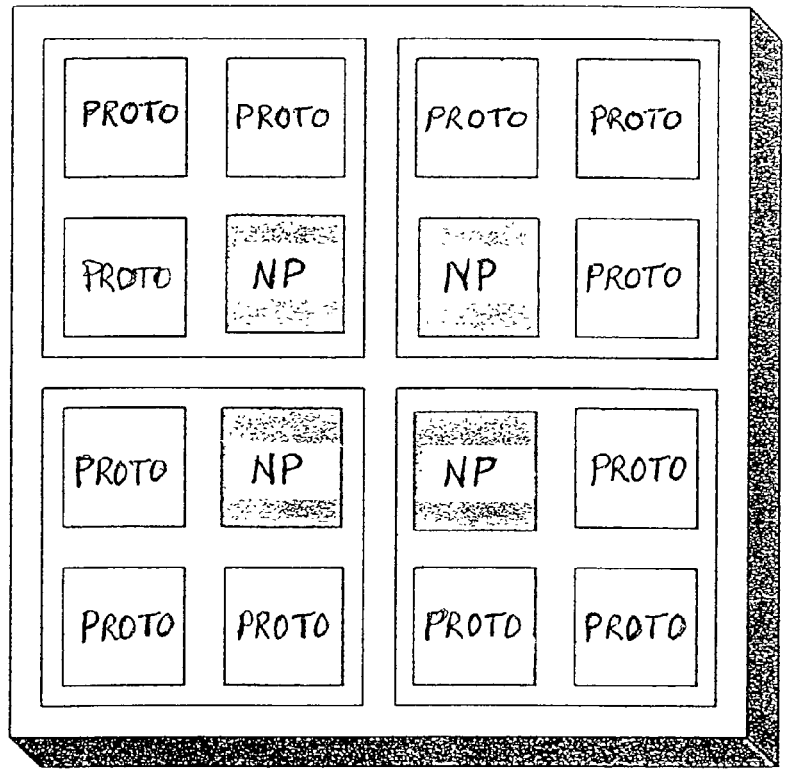
FIG. 13 is a simplified block diagram of a Field Programmable Nucleoprocessor Array (FPNA) comprising an array of four nucleus processors, each with three cascaded proto-processors.

FIG. 13 is a simplified block diagram of a Field Programmable Nucleoprocessor Array (FPNA) comprising an array of four nucleus processors (NP), each with three cascaded proto-processors. All of the processors may be implemented on a single piece of silicon. Using a 50 MHz external oscillator and with a ×4 Phase Lock Loop (PLL) multiplier, this device is capable of 3.2 bullion operations per second (BOPs). With the real time monitoring and debug technology described in co-owned U.S. Pat. No. 3,347,368 referred to above, all of the nucleus processors and proto-processors can be debugged and monitored in real time using a single JTAG connection.

It is thus believed that the operation and construction of the present invention will be apparent from the foregoing description. While the method, apparatus and system shown and described has been characterized as being preferred, it will be readily apparent that various changes and modifications could be made therein without departing from the scope of the invention as defined in the following claims.

What is claimed is:

1. An array of microcomputers comprising at least a first microcomputer and a second microcomputer, said array comprising:

a compound instruction register within the first microcomputer for receiving a first compound instruction that includes a cascade operation code (opcode) that, upon decoding, indicates whether the first instruction is to be sent to the second microcomputer in the array for execution;

decode logic within the first microcomputer that fetches and decodes the first compound instruction from the register;

a cascaded instruction pipeline for sending the first instruction to the second microcomputer for execution when the decoded cascade opcode indicates that the first instruction is to be sent to the second microcomputer;

execution logic within the second microcomputer that executes the first instruction and determines a result; and a cascade response bus for sending the result from the second microcomputer to the first microcomputer;

wherein the second microcomputer executes an application program until a compound instruction is received from the first microcomputer indicating that the second microcomputer is to execute the instruction, said compound instruction having priority over the application program.

2. The array of microcomputers of claim 1 further comprising execution logic within the first microcomputer that executes the first instruction when the decoded cascade opcode does not include an indication that the first instruction is to be sent to the second microcomputer.

3. The array of microcomputers of claim 2 wherein the execution logic within the first microcomputer continues to execute subsequent compound instructions that do not include an indication that the subsequent instructions are to be sent to the second microcomputer while the execution logic within the second microcomputer executes the first instruction.

4. The array of microcomputers of claim 1 wherein the array comprises a plurality of secondary microcomputers connected to the first microcomputer through the cascaded instruction pipeline and the cascade response bus, wherein each secondary microcomputer executes an application program until a compound instruction is received from the first microcomputer indicating that an identified secondary microcomputer is to execute the instruction, and wherein a plurality of compound instructions are sent from the first microcomputer to the plurality of secondary microcomputers through the cascaded instruction pipeline, each of said instructions including a cascade opcode that indicates which one or more of the microcomputers are to execute the instruction.

5. The array of microcomputers of claim 4 wherein at least one of the application programs performed by at least one of the plurality of secondary microcomputers performs input/output (I/O) control functions for the array.

6. The array of microcomputers of claim 5 wherein at least one of the application programs performed by at least one of the plurality of secondary microcomputers functions as a serial port without burdening the first microcomputer.

7. The array of microcomputers of claim 5 wherein at least one of the application programs performed by at least one of the plurality of secondary microcomputers functions as a peripheral device without burdening the first microcomputer, said peripheral device being selected from the group consisting of:

a programmable pulse width modulator;
a serial communication interface (SCI) port;
a first-in-first-out (FIFO) buffer;
an intelligent I/O controller; and
a liquid crystal display (LCD) controller.

8. The array of microcomputers of claim 4 wherein, upon receipt of a compound instruction from the first microcomputer with an indication that the one or more identified microcomputers are to execute the instruction, each identified microcomputer temporarily suspends the execution of its application program, executes the compound instruction, sends a result of the execution of the instruction to the first microcomputer through the cascade response bus, and then resumes execution of its application program, all without the use of interrupts.

9. A hyper-scalable microcontroller comprising:
a nucleus processor;
a cascaded instruction pipeline;
a plurality of proto-processors connected to the nucleus processor through the cascaded instruction pipeline; and control circuitry that selectively causes each of the plurality of proto-processors to operate independently or as an extension of the nucleus processor, wherein the control circuitry causes the nucleus processor to send a plurality of cascaded instructions to the proto-processors through the cascaded instruction pipeline, each of said instructions including an indication of which of the plurality of proto-processors is to execute each instruction, wherein at least one of the cascaded instructions includes an indication that a plurality of the pinto-processors are to execute the instruction.

10. The hyper-scalable microcontroller of claim 9 wherein at least one of the cascaded instructions includes an indication that all of the proto-processors are to execute the instruction.

11. The hyper-scalable microcontroller of claim 9 wherein each of the proto-processors includes:
execution logic that executes an application program to implement input/output (I/O) control functions for the hyper-scalable microcontroller.

12. The hyper-scalable microcontroller of claim 11 wherein each of the proto-processors includes decode logic that decodes the cascaded instructions sent to the proto-processors by the nucleus processor and determines whether a particular proto-processor is to execute a received cascaded instruction, said decode logic causing the execution logic in the particular proto-processor to suspend execution of the particular proto-processor's application program and to execute the cascaded instruction upon determining that the particular proto-processor is to execute the received cascaded instruction.

13. The hyper-scalable microcontroller of claim 12 wherein the execution logic in the particular proto-processor executes the cascaded instruction and determines a result, and the microcontroller further comprises a cascade response bus for sending the result from the particular proto-processor to the nucleus processor.

14. A method of controlling a plurality of microprocessors comprising the steps of:
connecting at least one proto-processor to a nucleus processor through a cascaded instruction pipeline, said at least one proto-processor executing an application program stored either internally or externally to the proto-processor; and
selectively causing the at least one proto-processor to operate independently or as an extension of the nucleus processor by sending from the nucleus processor, at least one cascaded compound instruction to the at least one proto-processor through the cascaded instruction pipeline, wherein the at least one compound instruction includes a cascade operation code (opcode) that indicates which of the at least one proto-processors is to execute the instruction, wherein when a proto-processor receives a compound instruction indicating that the receiving proto-processor is to execute the instruction, the receiving proto-processor suspends execution of its application program and executes the received instruction.

15. The method of controlling a plurality of microprocessors of claim 14 wherein the step of selectively causing the at least one proto-processor to operate independently or as an extension of the nucleus processor includes the steps of:
determining in each particular proto-processor whether a received cascade opcode indicates that the particular proto-processor is to execute the received compound instruction;
executing by the particular proto-processor, the proto-processor's application program, upon determining that the received cascade opcode does not indicate that the particular proto-processor is to execute the received compound instruction; and
upon determining that the received cascade opcode indicates that the particular proto-processor is to execute the received compound instruction:
suspending execution of the particular proto-processor's application program; and
executing by the particular proto-processor, the received compound instruction.

16. The method of controlling a plurality of microprocessors of claim 15 wherein at least one proto-processor's application program is operable to perform input/output (I/O) control functions.

17. Compound instruction logic in a nucleus processor for registering, decoding, and executing a compound instruction, said compound instruction logic comprising:
means for fetching and registering the compound instruction;
means for decoding the compound instruction and determining whether the compound instruction is a cascade instruction;
means responsive to a determination that the compound instruction is a cascade instruction, for presenting the compound instruction in a partially decoded form to associated autonomous proto-processors via a cascaded instruction pipeline, said cascade instruction causing the autonomous proto-processors to temporarily suspend operation of their own programs and to execute the cascade instruction; and
means for receiving processing results resulting from the execution of the cascade instruction by the autonomous proto-processors, and for loading the results into a working (W) register without utilizing Direct Memory Access (DMA) circuitry or interrupts.

* * * * *